United States Patent [19]

Cates, Jr. et al.

[11] 4,018,586
[45] Apr. 19, 1977

[54] ENVIRONMENTAL CONTROL OF BUSHING

[75] Inventors: Raymond H. Cates, Jr.; Walter L. Martin, Jr.; Sumpter D. Smith, all of Lexington, N.C.

[73] Assignee: PPG Industries, Inc., Pittsburgh, Pa.

[22] Filed: Dec. 29, 1975

[21] Appl. No.: 644,709

[52] U.S. Cl. .......................................... 65/2; 65/12
[51] Int. Cl.² .......................................... C03B 37/02
[58] Field of Search ................ 65/1, 2, 11 R, 11 W, 65/12

[56] References Cited

UNITED STATES PATENTS

| | | | |
|---|---|---|---|
| 3,002,226 | 10/1961 | Warthen | 65/1 X |
| 3,334,981 | 8/1967 | Glaser | 65/12 |
| 3,522,025 | 7/1970 | Smith | 65/12 |
| 3,547,610 | 12/1970 | Holman | 65/12 X |
| 3,632,287 | 3/1953 | Phillips | 65/12 |
| 3,746,525 | 7/1973 | Kasuga et al. | 65/12 |

Primary Examiner—Robert L. Lindsay, Jr.
Attorney, Agent, or Firm—Alan T. McDonald; John E. Curley

[57] ABSTRACT

A method and apparatus for eliminating short term yardage variation in the formation of glass filaments is disclosed. This method involves additionally cooling the bushing tips from which molten glass is drawn to form filaments utilizing a separate cooling means in addition to the fin coolers normally employed. The additional cooling means removes heat at a rate of from about 1,000 Btu's per hour to about 3,000 Btu's per hour (293 to 879 watts) based upon a drawing rate of about 35 to about 70 pounds of glass per hour (77 to 154 kilograms per hour). The method further involves either forming a controlled stream of air across the bushing tips from above the additional cooling means or preventing the direct impingement of air upon bushing tips by blocking the air with the additional cooling means, to provide a more stable thermal environment under the bushing.

35 Claims, 7 Drawing Figures

U.S. Patent    April 19, 1977    Sheet 1 of 2    4,018,586 ically in a linear plane. Variations in the diameters of glass strands along the length thereof results in a fabric which will not lie flat but rather becomes "puckered". Such a fabric is unacceptable.

ENVIRONMENTAL CONTROL OF BUSHING

BACKGROUND OF THE INVENTION

This invention relates to glass filament forming and more particularly to a method for providing a uniform thermal environment at each of a plurality of orificed filament forming tips on a heated glass fiber forming bushing.

It is well known in the art to produce filaments from various thermoplastic heat softenable materials, and especially glass, by flowing streams of molten material from a plurality of orificed tips provided on the bottom of a heated bushing. In the case of glass, the streams are attenuated, usually by mechanical means, into filaments which are then gathered into strands and processed into a variety of commercial products.

One typical use for such strand is in the formation of glass fabrics. In order that a satisfactory woven fabric be produced, it is imperative that the diameters of each glass strand be consistent in a linear plane. Variations in the diameters of glass strands along the length thereof results in a fabric which will not lie flat but rather becomes "puckered". Such a fabric is unacceptable.

Attempts have been made in the past to provide a uniform thermal environment at the bushing tips in order to produce a uniform glass strand. In U.S. Pat. No. 3,068,699 a heat radiating strip was molded to the bushing bottom and extended around the tips. However, there is no external control over the environment that is created.

In U.S. Pat. No. 3,672,857 it is suggested to control the environment around the bushing tips by adding an additional heat fence adjacent to or directly connected to the front bushing tips, thus providing additional heat to the tips.

Another suggested solution (U.S. Pat. No. 3,607,164) has been to plug up the boundary tips such that all active tips are surrounded by similar patterns of heat radiating tips. This would, however, decrease the number of filaments a given bushing could produce, and, as the need for larger bushings have increasing numbers of tips occurs, such a solution is far less desirable.

SUMMARY OF THE INVENTION

According to the present invention, it has been discovered that, contrary to the above-mentioned references, a more stable environment around bushing tips may be obtained by providing cooling to the tips by means of an additional cooling element adjacent to the front bushing tips. Such an element not only provides cooling to the bushing tips, but also allows control of an air stream flowing above the cooling element and across the bushing tips. It is known that due to the high speed of attenuating glass fibers, air is pulled downwardly with the fibers. By controlling the vertical distance between the cooling element and the bottom of the bushing, it is possible to control the air stream drawn in by the formed glass fibers over the cooling element. By placing the cooling element flush with the bottom of the bushing, the direct impingement of air upon front bushing tips is prevented. This combination of cooling and controlling the air flow around the bushing tips aids in obtaining a more stable environment around bushing tips.

Accordingly, it is the primary object of the present invention to provide a method of creating a more stable environment around the bushing tips in the formation of glass filaments.

Another object of the instant invention is to provide apparatus for carrying out the aforesaid method.

Other objects and advantages of the invention will become apparent in the following detailed description, with reference being made to the accompanying drawings.

DESCRIPTION OF THE PREFERRED EMBODIMENT

Figure 1:
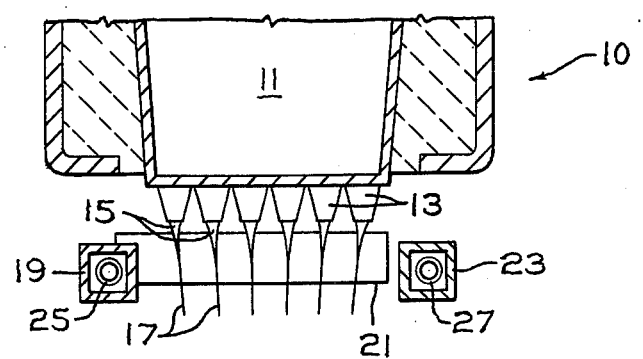
FIG. 1 is a side sectional view across a bushing illustrating the apparatus employed in the instant method.

Referring now to FIG. 1 there is shown a bushing 10 through which molten glass 11 is drawn through bushing tips 13. As the molten glass is attenuated through the bushing tips, cones of glass 15 are formed. Upon further attenuation these cones are formed into filaments 17 which are later gathered into composite strands.

The bushing tips 13 are cooled by means of a base cooling bar 19 having a heat transfer fluid such as water, flowing in a pipe 25 therethrough. Heat transfer elements 21 are connected to the base bar 19 so that heat may be removed from the area surrounding bushing tips 13 through the heat transfer elements 21 to the base bar 19 and ultimately removed by the flowing heat transfer liquid in pipe 25. The heat transfer elements 21 may be hollow pipes which would also carry heat transfer fluid or typically are in the form of solid fin members. However, the exact means employed for such cooling is not important to the operation of the instant invention and are so well known in the art that further explanation is unnecessary.

A second cooling bar 23 is placed adjacent to, but spaced from, the front bushing tips 13 and opposite from the cooling bar 19. This cooling bar 23 has no additional heat transfer elements nor is it connected to the heat transfer elements 21 associated with the base cooling bar 19. This bar 23 has a pipe 27 located within it which has flowing therethrough a heat transfer fluid such as water. This pipe or channel 27 is separate from line 25 for the base cooling bar 19 and provides control of the rate of heat removal from the bar 23. The location of this cooling bar 23 is adjustable with relation to its distance from the bushing tips both in the horizontal and vertical direction. This enables control of the amount of heat removed by the cooling bar 23 and the air stream flowing over the bar and across the bushing tips due to the high speed attenuation of the filaments.

By means of this invention, it is possible to allow a controlled amount of air to flow above the cooling bar 23 and across the bushing tips and downwardly with the formed filaments or, by placing the cooling bar 23 in direct contact with the bottom of the bushing 10, to prevent direct impingement of air upon the front bushing tips 13. It has been found that suitable results may be obtained with the cooling bar directly touching the bottom of the bushing frame or from about 0.125 inch to 0.25 inch (3.17 to 6.33 millimeters) below the bushing. It is preferred to place the bar about 0.1875 inch (4.7625 millimeters) below the bushing. It has also been found that the bar is capable of removing heat from the environment surrounding the bushing tips at rates, for example, of from about 1000 to about 3000 Btu's per hour (293 to 879 watts) based upon a drawing rate of from about 35 to 70 pounds per hour of glass orifices. The 2 designates a two-way split of the fibers into 400 filaments. The bars were 0.1875 inch (4.7625 millimeters) below the bushing bottoms. This allowed controlled air streams to flow below the bushings and onto the cones of molten glass formed below the bushing tips. Cooling water was provided to each cooling bar at a pressure of 50 psig (440,136 pascals) at a temperature of 86° F. (30° C.) The glass fibers were drawn at a linear rate of speed of 12,420 feet per minute (3,785.6 meters per minute). This resulted in 68 pounds per hour (149.6 kilograms per hour) of glass being drawn through each bushing. The results of these examples are shown in Table I.

TABLE I

| Ex. | Outlet Water Temp. | | Flow Rate | | Bush.Oper.Temp. | | Heat Removal | |
|---|---|---|---|---|---|---|---|---|
| | ° F. | (° C.) | Gal/Min. | (l/Min) | ° F. | (° C.) | Btu/Hr. | (Watt) |
| 1 | 89 | 31.7 | 1.36 | 5.15 | 2150 | 1176.6 | 2032 | 595.4 |
| 2 | 90 | 32.2 | 1.05 | 3.97 | 2128 | 1164.4 | 2092 | 613.0 |
| 3 | 89 | 31.7 | 1.20 | 4.54 | 2140 | 1171.1 | 1793 | 525.7 |
| 4 | 90 | 32.2 | 1.50 | 5.68 | 2051 | 1121.7 | 2988 | 875.5 |
| 5 | 88 | 31.1 | 1.33 | 5.03 | 2127 | 1161.7 | 1325 | 388.2 |

(77 to 154 kilograms per hour). This combination of effects leads to a more stable environment for drawing of the glass filaments, thus leading to a more consistent diameter of filaments. While the element 23 is illustrated as square in cross-section in FIG. 1, FIGS. 3 through 7 illustrate numerous other operative shapes that may be employed in the fabrication of such a bar.

Figure 2:
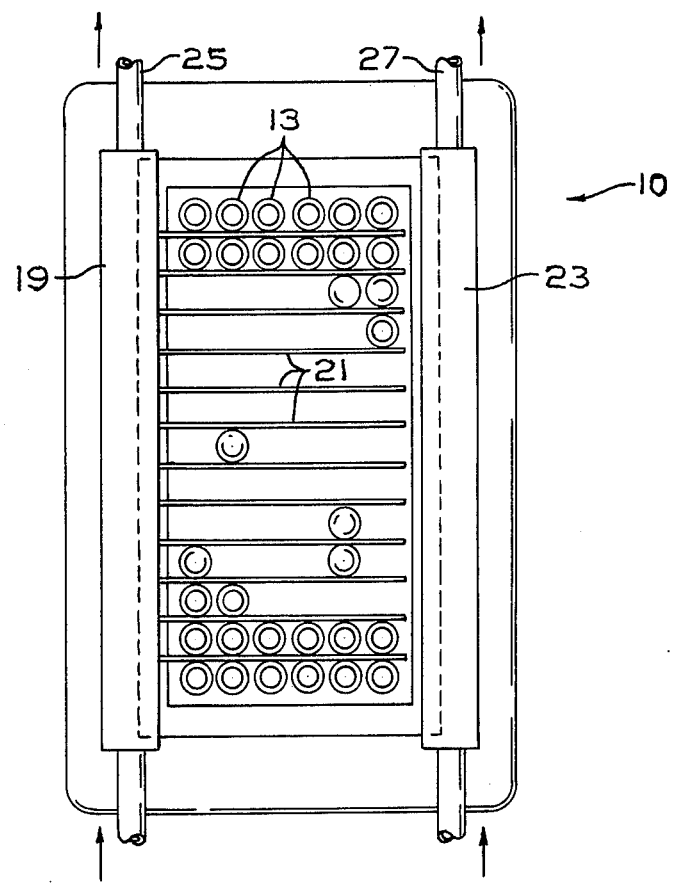
FIG. 2 is a view from underneath a bushing including a first embodiment of the invention.

FIG. 2 is a bottom plan view of the bushing of FIG. 1. This Figure illustrates rows of bushing tips 13 having heat transfer elements 21 therebetween. This figure also illustrates the connection of the heat transfer elements to the base cooling bar 19 and the direction of travel of heat transfer fluid through pipe 25 within the base cooling bar 19. This figure further illustrates the horizontal location of the cooling bar 23 with respect to the bushing tips 13 and the heat transfer elements 21. Of course, this horizontal location can be adjusted to give an optimum effect. Finally, a heat transfer fluid line 27 is illustrated within the cooling bar 23.

Figure 3:
FIGS. 3, 4 and 5 are sectional views of alternative shapes for the cooling bar employed in the instant invention.
Figure 4:
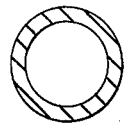
Figure 5:

FIGS. 3, 4 and 5 are cross-sectional views through alternative shapes for the cooling bar 23 not showing the pipe carrying the heat transfer liquid. Such shapes include oval, circular, or rectangular configurations, however any other shape can be used to give a desired direction to the air stream flow or heat transfer pattern.

Figure 6:
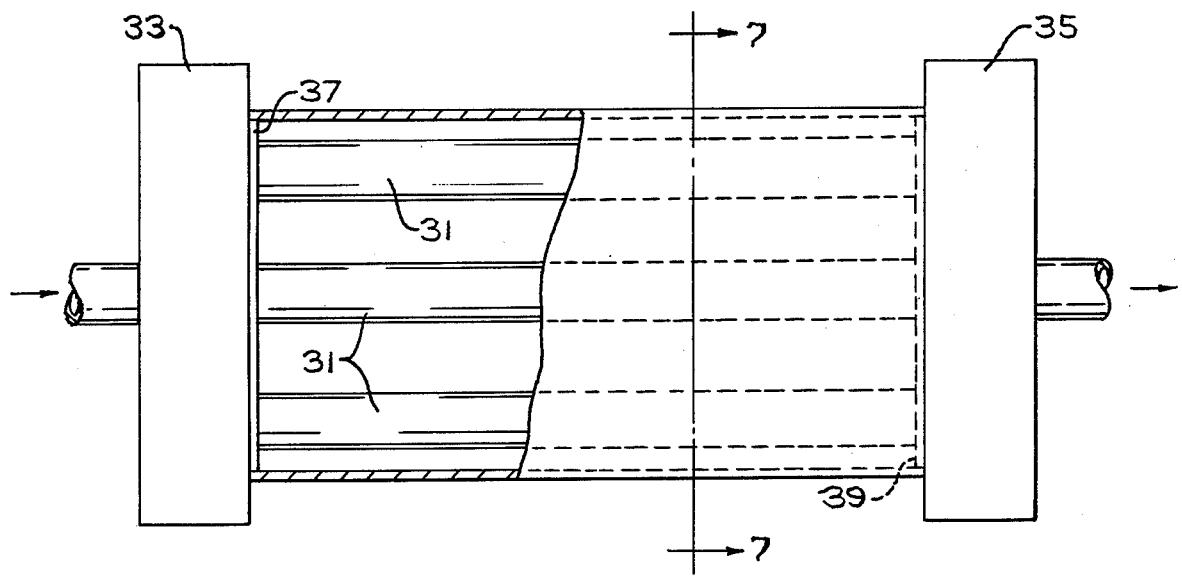
FIG. 6 is a front view, partially in section, of another alternative embodiment for the cooling bar.

FIG. 6 is a side view, partially in section, of an alternative embodiment of the cooling bar 23. In this embodiment, a hollow support element 29 has a series of tubes 31 carried within. These tubes 31 are interconnected by reservoirs 33 and 35 at the entry and exit, respectively, of the tubes 31. Heat transfer fluid passes into reservoir 33, through tubes 31, into reservoir 35 and out of the cooling bar 29. Flow is restricted to the tubes by means of a face plate 37 located at the entry to the tubes 31 and a face plate 39 which is located at the exit of the tubes 31. These plates 37 and 39 block the heat transfer fluid from passing between the tubes 31 as well as helping to keep the tubes 31 in place.

Figure 7:
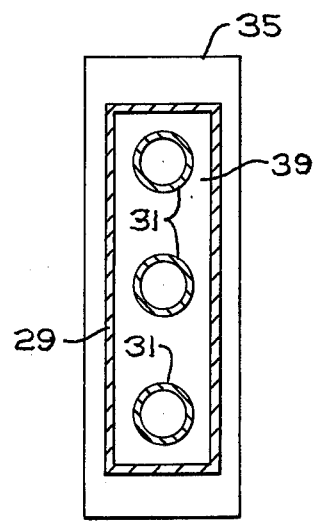
FIG. 7 is a sectional view through lines 7—7 of FIG. 6 illustrating the location of hollow tubes in the alternative embodiment of FIG. 6.

FIG. 7 is a cross-section of FIG. 6 through line 7—7 illustrating a typical location of the tubes 31 within this alternative embodiment.

EXAMPLES 1–5

Five 2/G75 bushings were fitted with the cooling bar of the present invention. A 2/G75 bushing contains 800

The resulting glass fibers of the above examples had highly uniform diameters which would be expected to produce a good quality glass fiber fabric.

In all of the above examples, heat was removed by the cooling bar in an amount of from 1,000 to 3,000 Btu's per hour and the air stream flowing above the cooling bar was controlled in such a manner to provide glass fibers having highly uniform diameters which would be expected to produce a good quality glass fiber fabric.

EXAMPLES 6–19

2/G75 bushings as in the previous examples were equipped with the cooling bar of the present invention. In these examples the cooling bar was connected directly against the bottom of the bushing frame. This prevented air from directly impinging on the front bushing tips. Cooling water was provided at an average inlet temperature of 86° F. (30° C.). The glass fiber was drawn at an average speed of 12,420 feet per minute (3,785.6 meters per minute), resulting in 68 pounds per hour (149.6 kilograms per hour) of glass fiber production.

In examples 6–19 the cooling bar was installed at the front of the bushing with standard fin coolers located at the rear.

The collected fibers were twisted with yarns on a standard twist frame and the yarns were tested for unevenness. Fabrics were then woven from the yarns and graded. The results of these tests appear in Table II.

TABLE II

| Example | % Unevenness (Uster) | Fabric Grade |
|---|---|---|
| 6 | 1.4 | D |
| 7 | 1.7 | C |
| 8 | 1.3 | C |
| 9 | 1.55 | C |
| 10 | 1.25 | D |
| 11 | 1.4 | C |
| 12 | 1.65 | D |
| 13 | 1.65 | C |
| 14 | 1.05 | B |
| 15 | 1.45 | C |
| 16 | 1.75 | C |
| 17 | 1.55 | C |
| 18 | 1.55 | D |

TABLE II-continued

| Example | % Unevenness (Uster) | Fabric Grade |
|---|---|---|
| 19 | 1.65 | D |

As can be seen from these results, the percentage of unevenness, as measured by the Uster test was quite low, however, the fabric grade formed from the strands produced in this manner were inconsistent.

EXAMPLES 20–57

Examples 6–19 were repeated, with the cooling bar lowered to 0.1875 inch (4.7625 millimeters) below the bushing.

The collected fiber were twisted and tested as in Examples 6–19 and fabric woven from the yarns tested as in Examples 6–19. The results of these tests appear in Table III.

TABLE III

| Example | % Unevenness (Uster) | Fabric Grade |
|---|---|---|
| 20 | 1.45 | A |
| 21 | 1.4 | A |
| 22 | 1.15 | A |
| 23 | 1.2 | A |
| 24 | 1.2 | A |
| 25 | 1.1 | A |
| 26 | 1.15 | A |
| 27 | 1.25 | B |
| 28 | 1.3 | A |
| 29 | 1.15 | A |
| 30 | 1.3 | B |
| 31 | 1.55 | B |
| 32 | 1.1 | A |
| 33 | 1.25 | A |
| 34 | 1.05 | A |
| 35 | 1.0 | A |
| 36 | 1.2 | A |
| 37 | 1.4 | A |
| 38 | 1.4 | A |
| 39 | 1.4 | B |
| 40 | 1.3 | A |
| 41 | 1.55 | A |
| 42 | 1.3 | A |
| 43 | 1.35 | A |
| 44 | 1.2 | A |
| 45 | 1.8 | B |
| 46 | 1.25 | A |
| 47 | 1.8 | C |
| 48 | 1.7 | A |
| 49 | 1.95 | A |
| 50 | 1.2 | A |
| 51 | 1.55 | B |
| 52 | 1.05 | A |
| 53 | 1.25 | A |
| 54 | 1.1 | A |
| 55 | 1.2 | A |
| 56 | 1.2 | A |
| 57 | 1.1 | A |

As can be seen from these results, the percentage of unevenness, as measured by the Uster test, was quite low and, the fabric grade formed from the strands produced in this manner were highly consistent.

While the foregoing description of the invention has been made with reference to specific embodiments, it is not intended that the invention be limited except insofar as in the appended claims.

We claim:

1. In a method of forming glass filaments comprising drawing glass filaments from cones of molten glass below bushing tips in a bushing, said bushing having a bushing frame and having below said bushing tips means for removing heat including a base cooling bar having a heat transfer fluid flowing therethrough and having connected thereto cooling fins positioned between rows of said bushing tips and being in heat transfer relationship to said base cooling bar whereby heat is removed from said bushing tips, the improvement comprising preventing short term yardage variation in the filaments by positioning and adjusting a second cooling bar, vertically spaced from said bushing frame and horizontally spaced from said bushing tips and said fins, flowing a heat transfer fluid through said second cooling bar whereby said second cooling bar removes heat from said bushing tips, said vertical and horizontal spacings being sufficiently adjusted to provide an airstream over said cooling bar and in contact with said bushing tips to therby prevent said short term yardage variation.

2. The method of claim 1 wherein said heat transfer elements are fin coolers.

3. The method of claim 1 wherein said heat transfer fluid is water.

4. The method of claim 1 wherein the cross section of said second cooling bar is rectangular.

5. The method of claim 1 wherein the cross section of said second cooling bar is circular.

6. The method of claim 1 wherein the cross section of said second cooling bar is oval.

7. The method of claim 1 wherein the cross section of said second cooling bar is square.

8. The method of claim 1 wherein the said second cooling bar comprises a hollow element having a plurality of tubes connected therein, and having means for connecting said tubes at their ends to permit the flowing of said heat transfer fluid through each of said tubes.

9. The method of claim 8 wherein said means for connecting said hollow tubes are reservoirs located at the ends of said tubes.

10. The method of claim 1 wherein said control of said air stream comprises preventing direct impingement of air on said front bushing tips.

11. The method of claim 1 wherein said second cooling bar is about 0.125 to about 0.25 inch (3.17 to 6.33 millimeters) below the bushing.

12. The method of claim 11 wherein said second cooling bar is about 0.1875 inch (4.7625 millimeters) below the bushing.

13. The method of claim 1 wherein said heat is removed at a rate of from about 1000 to about 3000 Btu's per hour (293 to 879 watts) at a drawing speed of from about 35 to about 70 pounds per hour (77 to 154 kilograms per hour) of glass.

14. In a method of forming glass filaments comprising drawing glass filaments from cones of molten glass below bushing tips in a glass fiber forming bushing, said bushing having a bushing frame and having below said bushing tips means for removing heat including a base cooling bar having heat transfer fluid flowing therethrough and cooling fins positioned between rows of said bushing tips and connected to said base cooling bar in a heat transfer relationship whereby heat is removed from said bushing tips, the improvement comprising preventing short term yardage variation in said filaments by removing heat in an amount from about 1,000 to about 3,000 BTU/hour (about 293 to about 897 watts) at a drawing speed of about 35 to 70 pounds per hour (77 to 154 kilograms per hour) of glass and while passing a controlled airstream across and in contact with said bushing tips by positioning and adjusting a second cooling bar vertically spaced from said bushing frame and horizontally spaced from said bushing tips and said cooling fins and flowing a heat transfer fluid through said second cooling bar, to provide a more uniform environment under said bushing tips and to thereby prevent short term yardage variation in the filaments.

15. The method of claim 14 wherein said heat transfer fluid is water.

16. The method of claim 14 wherein said heat transfer elements are fin coolers.

17. The method of claim 14 wherein said second cooling bar is about 0.125 to 0.25 inch (3.17 to 6.33 millimeters) below the bushing.

18. The method of claim 17 wherein said second cooling bar is about 0.1875 inch (4.7625 millimeters) below the bushing.

19. The method of claim 14 wherein the cross section of said second cooling bar is rectangular.

20. The method of claim 14 wherein the cross section of said second cooling bar is circular.

21. The method of claim 14 wherein the cross section of said second cooling bar is oval.

22. The method of claim 14 wherein the cross section of said second cooling bar is square.

23. The method of claim 14 wherein said second cooling bar comprising a hollow element having a plurality of tubes connected within and having means for connecting said tubes at their ends to prevent flowing of said heat transfer fluid through said tubes.

24. The method of claim 14 wherein said means for connecting said tubes are reservoirs at the ends of said tubes.

25. The method of claim 14 wherein said control of said air stream comprises direct impingement of air onto said front bushing tips.

26. In a method of forming glass filaments comprising drawing glass filaments from cones of molten glass below bushing tips in a bushing, said bushing having a bushing frame and having below said bushing tips means for removing heat including a base cooling bar having heat transfer fluid flowing therethrough and having connected thereto cooling fins positioned between rows of said bushing tips and being in heat transfer relationship to said base cooling bar whereby heat is removed from said bushing tips, the improvement comprising preventing short term yardage variation in the filaments being drawn by positioning and adjusting a second cooling bar horizontally spaced from said bushing tips and said cooling fins and directly contacting the bottom of said bushing frame, flowing a heat transfer fluid through said cooling bar whereby said second cooling bar removes heat from said bushing tips and prevents direct impingement of air on said front bushing tips to thereby prevent short term yardage variation in the filaments.

27. The method of claim 26 wherein said heat is removed at a rate of from about 1000 to about 3000 Btu's per hour (293 to 879 watts) at a drawing speed of from about 35 to about 70 pounds per hour (77 to 154 kilograms per hour) of glass.

28. The method of claim 26 wherein said heat transfer elements are fin coolers.

29. The method of claim 26 wherein said heat transfer fluid is water.

30. The method of claim 26 wherein the cross section of said second cooling bar is rectangular.

31. The method of claim 26 wherein the cross section of said second cooling bar is circular.

32. The method of claim 26 wherein the cross section of said second cooling bar is oval.

33. The method of claim 26 wherein the cross section of said second cooling bar is square.

34. The method of claim 26 wherein the said second cooling bar comprises a hollow element having a plurality of tubes connected therein, and having means for connecting said tubes at their ends to permit the flowing of said heat transfer fluid through each of said tubes.

35. The method of claim 26 wherein said means for connecting said hollow tubes are reservoirs located at the ends of said tubes.

* * * * *